United States Patent [19]
Lee et al.

[11] Patent Number: 5,583,659
[45] Date of Patent: Dec. 10, 1996

[54] MULTI-WINDOWING TECHNIQUE FOR THRESHOLDING AN IMAGE USING LOCAL IMAGE PROPERTIES

[75] Inventors: Yongchun Lee, Rochester; Joseph M. Basile, Ontario; Peter Rudak, Hilton, all of N.Y.

[73] Assignee: Eastman Kodak Company, Rochester, N.Y.

[21] Appl. No.: 338,051

[22] Filed: Nov. 10, 1994

[51] Int. Cl.$^6$ ........................................ H04N 1/40
[52] U.S. Cl. .................. 358/455; 358/464; 358/465; 358/466; 382/270; 382/273
[58] Field of Search ................... 358/465, 466, 358/455, 456, 443, 433, 447, 462–464, 448; 382/266, 269, 273, 274, 270, 252; 327/72; 341/155; 395/100

[56] References Cited

U.S. PATENT DOCUMENTS

| | | | |
|---|---|---|---|
| 4,251,837 | 2/1981 | Janeway III, et al. | 358/455 |
| 4,468,704 | 8/1984 | Stoffel et al. | 358/464 |
| 4,709,274 | 11/1987 | Tanioka | 358/455 |
| 4,868,670 | 9/1989 | Morton et al. | 358/447 |
| 4,901,063 | 2/1990 | Kimura et al. | 382/266 |
| 4,908,875 | 3/1990 | Assael et al. | 382/272 |
| 4,912,569 | 3/1990 | Petilli | 358/465 |
| 4,918,543 | 4/1990 | Petilli | 358/465 |
| 5,025,480 | 6/1991 | Morton et al. | 382/271 |
| 5,034,990 | 7/1991 | Klees | 382/252 |
| 5,050,227 | 9/1991 | Furasawa et al. | 382/269 |
| 5,055,944 | 10/1991 | Shibahara | 382/266 |
| 5,070,413 | 12/1991 | Sullivan et al. | 358/443 |
| 5,075,872 | 12/1991 | Kumagai | 382/172 |
| 5,086,484 | 2/1992 | Katayama et al. | 382/270 |
| 5,091,967 | 7/1992 | Ohsawa | 382/266 |
| 5,150,223 | 9/1992 | Telle | 358/448 |
| 5,153,925 | 10/1992 | Tanioka et al. | 382/272 |
| 5,200,831 | 4/1993 | Tai | 358/298 |
| 5,201,014 | 4/1993 | Degi et al. | 382/172 |
| 5,220,624 | 6/1993 | Sakamoto et al. | 382/266 |
| 5,224,177 | 6/1993 | Doi et al. | 382/266 |
| 5,243,445 | 9/1993 | Kaike | 358/466 |
| 5,268,773 | 12/1993 | Park et al. | 358/466 |
| 5,271,064 | 12/1993 | Dhawan et al. | 382/266 |
| 5,278,919 | 1/1994 | Sugiura et al. | 382/176 |
| 5,313,533 | 5/1994 | Scott | 382/273 |
| 5,315,405 | 5/1994 | Okuwaki | 358/445 |
| 5,369,572 | 11/1994 | Haraki et al. | 382/266 |
| 5,448,656 | 9/1995 | Tanaka | 358/455 |
| 5,450,531 | 9/1995 | Ng et al. | 382/269 |
| 5,452,367 | 9/1995 | Bick et al. | 382/128 |

OTHER PUBLICATIONS

M. Kamel et al., "Extraction of Binary Character/Graphics Images from Grayscale Document Images", *CVGIP: Graphical Models and Image Processing*, vol. 55, No. 3, May 1993, pp. 203–217.

*Primary Examiner*—Edward L. Coles, Sr.
*Assistant Examiner*—Fan Lee
*Attorney, Agent, or Firm*—Milton S. Sales and Stanger, Michaelson, Spivak and Wallace

[57] ABSTRACT

A technique, specifically apparatus and an accompanying method, for accurately thresholding an image based on local image properties, specifically luminance variations, and particularly such a technique that uses multi-windowing for providing enhanced immunity to image noise and lessened boundary artifacts. Specifically, a localized intensity gradient, $G(i,j)$, is determined for a pre-defined window (300) centered about each image pixel $(i, j)$. Localized minimum and maximum pixel intensity measures, $L_{min}$ and $L_{max}$, respectively, are also determined for another, though larger, window (330) centered about pixel $(i,j)$. Also, a localized area gradient measure, $GS(i,j)$, is determined as a sum of individual intensity gradients for a matrix of pixel positions (370) centered about pixel position $(i,j)$. Each image pixel $(i,j)$ is then classified as being an object pixel, i.e., black, or a background pixel, i.e., white, based upon its area gradient, GS $(i,j)$, and associated $L_{min}$ and $L_{max}$ measures.

31 Claims, 8 Drawing Sheets

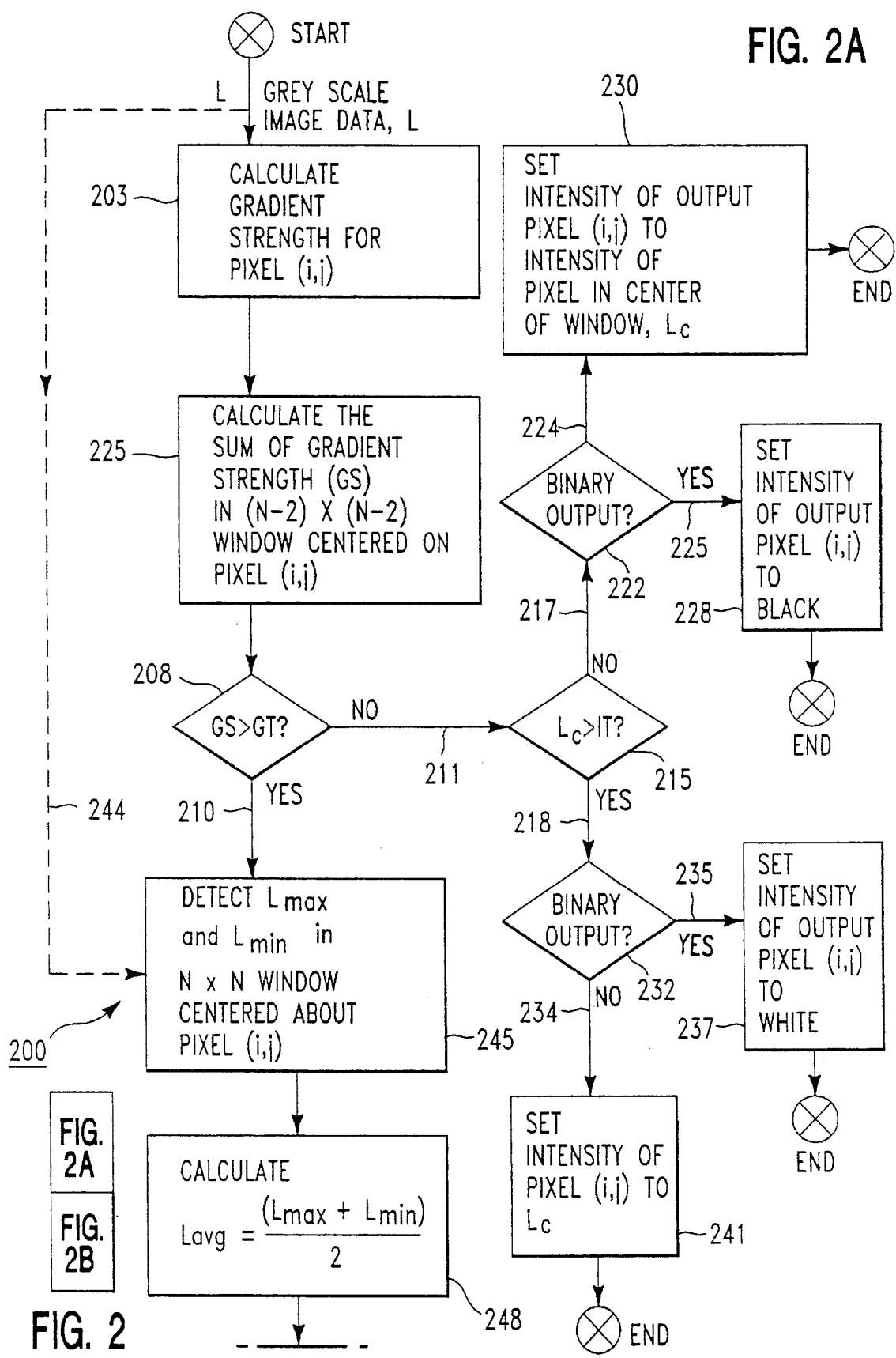

FIG. 3A
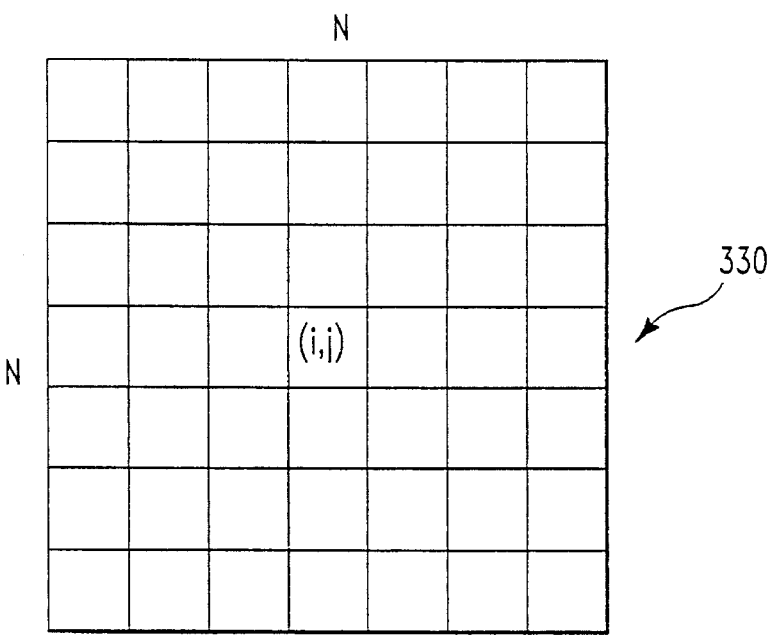
FIG. 3B
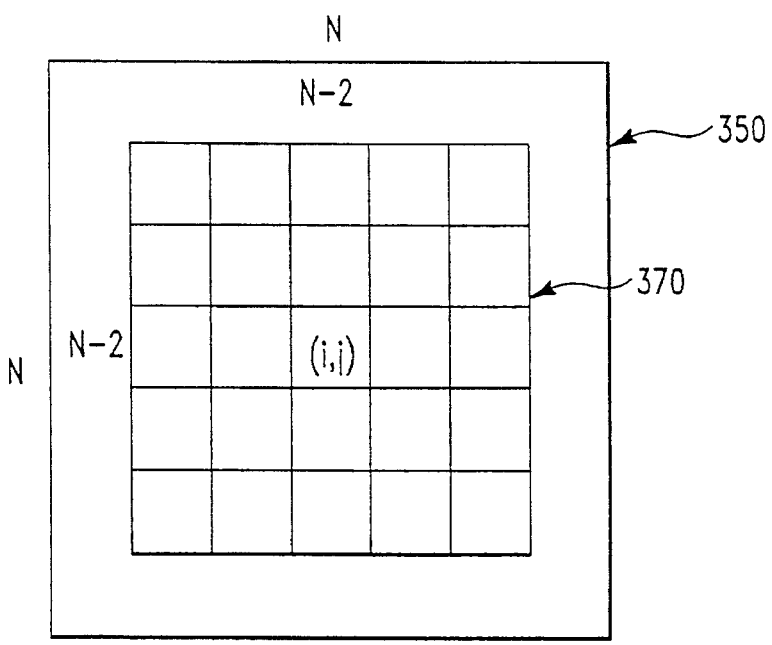
FIG. 3C

MULTI-WINDOWING TECHNIQUE FOR THRESHOLDING AN IMAGE USING LOCAL IMAGE PROPERTIES

TECHNICAL FIELD OF THE INVENTION

The invention relates to a technique, specifically apparatus and an accompanying method, for accurately thresholding an image based on local image properties, specifically luminance variations, and particularly one that uses multi-windowing for providing enhanced immunity to image noise and lessened boundary artifacts.

BACKGROUND ART

With digital image processing and digital communication becoming increasingly prevalent today, increasing amounts of printed or other textual documents are being scanned for subsequent computerized processing of one form or another and/or digital transmission. This processing may involve, for example, optical character recognition, for converting printed characters, whether machine printed or handwritten, from scanned bit-mapped form into an appropriate character set, such as ASCII, the latter being more suitable for use with word processing and similar computerized document-processing tasks.

Scanning a gray-scale document typically yields a multi-bit, typically eight-bit, value for each pixel in the scanned document. The value represents the luminance, in terms of a 256-level gray scale, of a pixel at a corresponding point in the document. These pixels are generated, depending upon the resolution of the scanner, frequently at resolutions of 200–400 pixels/inch (approximately 80–160 pixels/cm), though with highly detailed images at upwards of 1200 or more pixels/inch (approximately 470 pixels/cm). Consequently, a scanned 8½ by 11 inch (approximately 22 by 28 cm) image will contain a considerable amount of gray-scale data. Inasmuch scanned text generally presents a written or printed characters of some sort against a contrasting colored background, typically dark or black print against a white or light colored background, or vice versa, the exact luminance value at any one pixel in the text is not as important as whether that pixel is either part of a character or the background. Therefore, scanned textual images, or scanned textual portions of larger images containing both text and graphics, can be efficiently represented by single-bit pixels in which each pixel in a scanned image is simply set to, e.g., a "one" if that pixel in the original image is part of a character or part of foreground information, or to, e.g., a "zero" if that pixel in the original image is part of the image background. To easily distinguish the different types of scanned images, a gray-level image is defined as one having multi-bit (hence multi-value) pixels, whereas a binary (or bi-level) image is formed of single-bit pixels. Furthermore, since binary images generate considerably less data for a given textual image, such as, e.g., one-eighth, as much as for an eight-bit gray-scale rendering of the same image, binary images are more efficient than corresponding gray-scale images and thus preferred for storage and communication of textual images. Binary images are also preferred because of their easy compressibility using standard compression techniques, e.g., CCITT Groups 3 or 4 compression standards.

Gray-scale images are converted to binary images through a so-called thresholding process. In essence, each multi-bit pixel value in a gray-scale scanned image is compared to a pre-defined threshold value, which may be fixed, variable, or even adaptively variable, to yield a single corresponding output bit. If the multi-bit pixel value equals or exceeds the threshold value for that particular pixel, the resultant single-bit output pixel is set to a "one"; otherwise if the threshold is greater than the multi-bit pixel, then the resultant single-bit output pixel remains at "zero". In this manner, thresholding extracts those pixels, such as those which form characters, or other desired objects, from the background in a scanned gray-scale image, with the pixels that form each character, or object, being one value, typically that for black, and the pixels for the background all being another value, typically that for white. For ease of reference, we will hereinafter collectively refer to each character or other desired object in the image as simply an "object".

Ideally, the best thresholding process is one which accurately selects all the object pixels, but nothing more, in the scanned image and maps those pixels to a common single-bit value, such as, e.g., "one" for black. In practice, noise, background shading, lighting non-uniformities in a scanning process and other such phenomena, preclude the use of a single fixed threshold for an entire image. In that regard, if the threshold is too low, the resulting image may contain an excessive amount of noise in certain, if not all regions; or, if too high, insufficient image detail, again in certain, if not all, regions—thereby complicating the subsequent processing of this image. Given this, the art recognizes that a preferred approach would be to select a different threshold value that is appropriate to each and every pixel in the scanned image. In doing so, the proper threshold value is determined based upon local properties of the image, i.e., certain image characteristics that occur in a localized image region for that pixel. Hence, the threshold would vary across the image, possibly even adapt to changing localized image conditions.

In general, a common methodology for variable thresholding relies on measuring localized image characteristics, such as local intensity contrast (or gradient), local averaged intensity and/or local variance, in a local window centered about a pixel of interest and then using these measures to classify image pixels into either object pixels, black, or background pixels, white. Here, too, reality diverges from the ideal inasmuch this methodology is complicated, and often frustrated, by a need to extract various objects in a wide range of documents but with minimal user intervention, such as for purposes of initialization and object identification, and while still yielding a clean background in the thresholded image. In reality, these objects may include, e.g., dim, broken objects; and objects that present a relatively low contrast, such as white objects in a gray background; and gray objects embedded in a black background.

Nevertheless, given the overwhelming inability of fixed thresholding to provide adequate performance with actual images, the art has persisted by teaching several variable thresholding approaches that attempt to provide satisfactory performance. However, all these approaches suffer from one or more drawbacks that, in practice, tend to limit their utility.

Various approaches, based upon measurements of different localized image properties, are taught in M. Kamel et al., "Extraction of Binary Character/Graphics Images from Grayscale Document Images", *CVGIP: Graphical Models and Image Processing*, Vol. 55, No. 3, May 1993, pages 203–217. Here, a "logical level" approach is based on comparing a gray level of a given pixel or its smoothed gray level (if the image is noisy) with four local averages in neighborhoods centered about four pixels orthogonally surrounding the given pixel. If the gray level of the given pixel is sufficiently below all four local averages, then the given pixel is extracted. Another approach, so-called "mask-based subtraction", relies on considering every pixel in an image as a sum of a background image and a character/graphics image. First, most of the background pixels are detected using a logical filter; the filter ostensibly functioning to remove "particle" noise. The filter is applied to four pixel sequences that correspond to four straight lines passing through each given pixel with slopes of 0, π/4, π/2 and 3π/4. The resulting "filtered" binary image contains character/graphics pixels which are black and background pixels which are white. Thereafter, this filtered, or "mask", image is modified by detecting additional background pixels using a predetermined stroke width, and then, for every possible character/graphics pixel, the gray level of its background image is estimated by linear interpolating four background pixels. Lastly, a gray-scale character/graphics image is obtained by subtracting the estimated background image from the original scanned image with resulting differences then being globally thresholded to yield a binary character/graphics image. Though the global threshold value itself is fixed, basing the result on a difference between this threshold and a varying background value essentially implements a variable threshold. Though, at first blush, these two approaches would appear to be somewhat immune to noise, in actuality, each of these approaches is highly sensitive to noise and often results in a noisy background when extracting dim and/or broken objects in a thresholded image.

Another approach, as described in U.S. Pat. No. 4,868,670 (issued to R. R. A. Morton et al on Sep. 19, 1989 and owned by the present assignee hereof), relies on tracking a background value in an image, with a threshold value being a sum of a tracked background value, a noise value and a feedback signal. Here, whenever a transition occurs in the image, such as an edge, the feedback signal is momentarily varied in a pre-defined pattern to momentarily modify the threshold value such that ostensibly an output filtered thresholded pixel value has a reduced noise content. Unfortunately, in practice, this technique often exhibits boundary artifacts at intensity transitions due to abrupt changes in background intensity. In addition, since background tracking tends to exhibit poor reliability, this approach has difficulties in detecting low contrast objects.

A further approach is described in U.S. Pat. No. 4,468,704 (issued to J. C. Stoffel et al on Aug. 28, 1984). Here, adaptive thresholding is implemented by using an image offset potential, which is obtained on a pixel-by-pixel basis as a function of white peak and black valley potentials in the image. This offset potential is used in conjunction with nearest neighbor pixels to provide an updated threshold value that varies pixel-by-pixel. The peak and valley potentials are generated, for each image pixel, by comparing the image potential of that pixel with predetermined minimum white peak and maximum black valley potentials. Unfortunately, this technique also appears to exhibit difficulties in extracting low contrast objects in a thresholded image.

Therefore, a need exists in the art for a technique, specifically apparatus and an accompanying method, for accurately and reliably thresholding a gray-scale image to locate objects therein using a threshold that varies based on local image properties. This technique should exhibit heightened noise immunity and reduced boundary artifacts, as well as increased accuracy in detecting low contrast objects, than do conventional variable thresholding techniques.

DISCLOSURE OF THE INVENTION

We have substantially and advantageously overcome the deficiencies in the art through our inventive multi-window thresholding technique.

Specifically, through our invention, a localized intensity gradient, G (i,j), is determined for each pixel (i,j) in an incoming scanned gray-scale bit-mapped image. This gradient is determined for a window, illustratively 3-by-3, of pixels centered about pixel (i,j). Next, minimum intensity, $L_{min}$, maximum intensity, $L_{max}$, levels are detected for an N-by-N pixel window centered over the image about pixel (i,j). In addition, a localized area gradient, GS(i,j) being a sum of individual intensity gradients, is ascertained for a matrix (window) of pixel positions, typically n-2-by-n-2 pixels, centered about position (i,j). Each pixel (i,j) is then classified as being an object pixel, i.e., black, or a background pixel, i.e., white, primarily based upon its area gradient, GS(i,j), and secondarily upon its associated $L_{min}$ and $L_{max}$ values. These three parameters are determined for each and every pixel(i,j) in the image with that pixel being centered in various windows, one for determining both the gradient strength, G (i,j), and the other for determining the associated $L_{min}$ and $L_{max}$ values. Once the gradient strength values are determined, they are then windowed, about pixel, position (i,j), in determining its corresponding area gradient, GS (i,j).

Using these local measures, each image pixel(i,j) is first classified as being near an edge or not. In that regard, each pixel near an edge is so classified if the local measures therefor, specifically its associated area gradient, exceeds a pre-defined threshold value. Otherwise, that pixel is viewed as falling within a locally flat field, i.e., of relatively constant gray-scale. Specifically, edge pixels are classified by comparing their intensity values against average intensity values for local N-by-N pixel windows therefor; in contrast, pixels in flat fields are classified by comparing their intensity against a pre-determined intensity value.

In particular, an image pixel(i,j) located in a vicinity of an edge in the image is detected whenever the area gradient, GS(i,j), for that pixel is high, particularly being larger than a predefined gradient threshold, GT. Once such a pixel is found, each pixel on a darker side of the edge is found. This latter pixel being in the center of a local N-by-N, e.g., 7-by-7, pixel window is classified as an object pixel, i.e., black, whenever its intensity, $L_c$, is smaller than an average of its associated $L_{min}$ and $L_{max}$ values. Alternatively, if the intensity of this latter pixel, $L_c$, exceeds the average intensity value of $L_{min}$ and $L_{max}$, then this particular pixel is classified as being background, i.e., white.

Where the area gradient, GS (i,j), for pixel (i,j) is less than the gradient threshold, such as where the N-by-N window slides along an image region of relatively constant gray-scale, pixel(i,j) is classified by simple thresholding, i.e., thresholding its gray-scale value against a constant pre-defined threshold value, IT. Here, if the gray-scale value of pixel(i,j) is less than the threshold value IT, this pixel is classified as an object pixel, i.e., black; otherwise, this pixel is designated as part of the background, i.e., white.

To enhance image edges and by doing so further increase thresholding accuracy, the intensity values of those pixels near an edge are modified. For the preferred embodiment, black pixels are illustratively represented by a value of zero and white pixels by a value of "1". Specifically, for those pixels located on a darker side of an edge and having an intensity value that exceeds the threshold value, IT, the intensity of each of these pixels is reduced to a value slightly below threshold IT, e.g., to a value IT−. In contrast, the intensity values for those pixels, located on a brighter side of an edge and having an intensity value less than threshold value IT, are increased to an intensity value slightly greater than threshold value IT, e.g., to value IT+. A high quality binary image can then be produced by merely thresholding the resulting gray-scale image against pre-defined threshold value IT.

Advantageously, through the use of area (summed intensity) gradients, the present invention significantly reduces both background noise and boundary artifact generation while accurately extracting objects in a thresholded image. The modified gray-scale image, when subsequently thresholded using a fixed threshold value IT, greatly enhances detection of low contrast objects and thus readily produces a high quality binary image.

BRIEF DESCRIPTION OF THE DRAWINGS

The teachings of the present invention may be readily understood by considering the following detailed description in conjunction with the accompanying drawings, in which:

FIG. 2 depicts the correct alignment of the drawing sheets for FIGS. 2A and 2B;

FIGS. 2A and 2B collectively depict a high-level flowchart of our inventive multi-windowing thresholding method;

FIG. 3A depicts a 3-by-3 matrix of pixel location definitions which we use in determining, through a "Sobel" gradient operator, gradient strength for current pixel(i,j);

FIG. 3B depicts a graphical representation of an N-by-N neighborhood of pixels centered about a current pixel(i,j) in an image intensity record;

FIG. 3C depicts a graphical representation of an (N-2)-by-(N-2) neighborhood of pixels centered about pixel position (i,j) in an image intensity gradient record;

To facilitate understanding, identical reference numerals have been used, where possible, to denote identical elements that are common to various figures.

MODES OF CARRYING OUT THE INVENTION

After reading the following description, those skilled in the art will quickly realize that our invention is applicable for use in nearly any document imaging system for accurately thresholding scanned documentary images containing line art, both regardless of what that line art contains and the media upon which the image originally appears. For example, the line art could be graphs, maps, characters and/or line (skeletal) drawings. Nevertheless for the purpose of simplifying the following discussion, we will discuss our invention in the context of use in thresholding scanned character data, such as textual letters and numbers, which we will collectively refer to hereinafter as "objects".

For purposes of illustration and discussion, we define black and white gray-scale pixels as having eight-bit gray-scale value of "0" and "255", respectively. For consistency, we also define output binary pixels with black being "0" and white being "1". Clearly, our inventive method will function just as well with opposite definitions, though with all the relevant inequalities that compare pixel intensities, as would be readily apparent to those skilled in the art, reversed from those shown and described.

Figure 1:
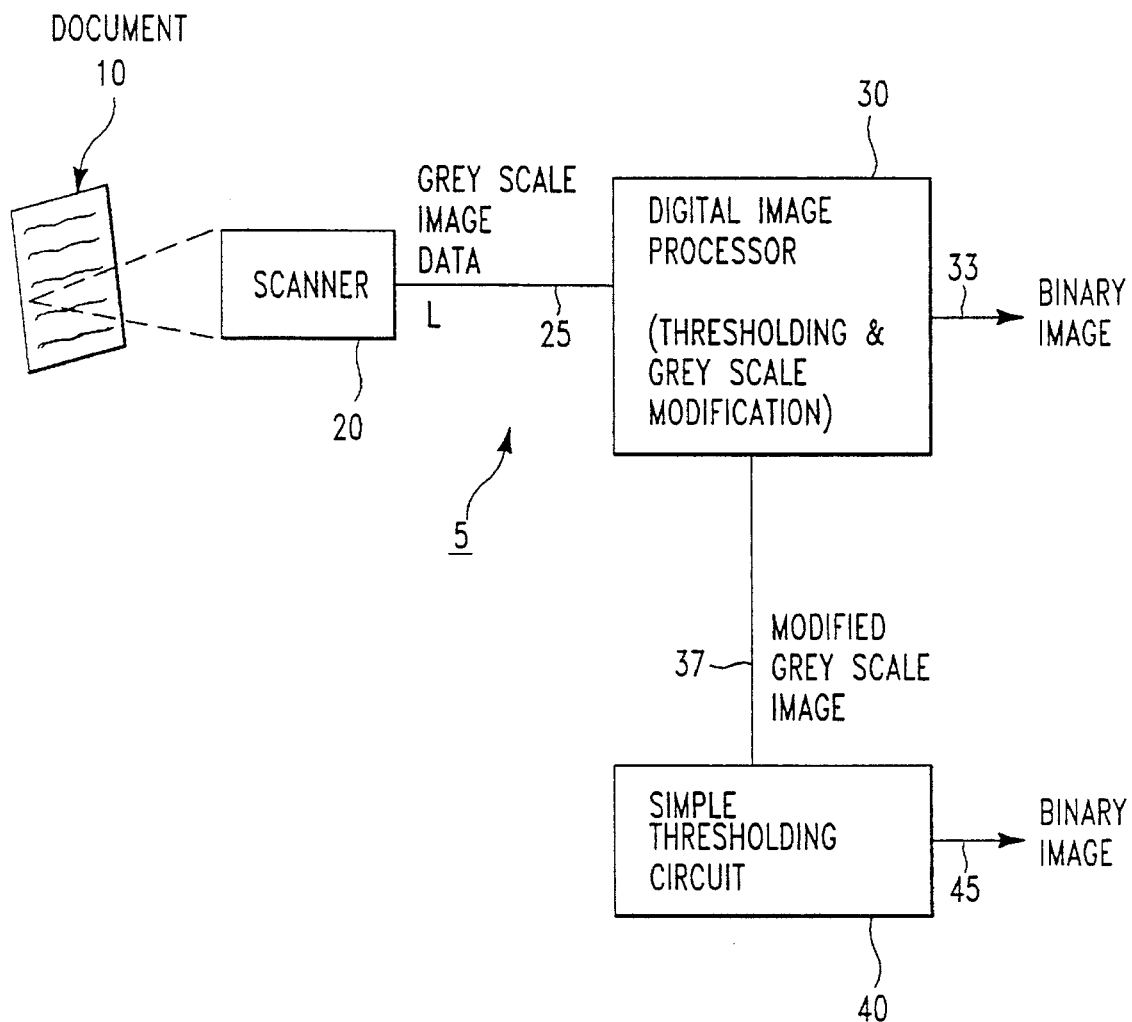
FIG. 1 depicts a high-level block diagram of document imaging system 5 that embodies the teachings of our present invention.

FIG. 1 depicts a high-level block diagram of document imaging system 5 that embodies the teachings of our present invention. As shown, system 5 is formed of gray-scale scanner 20, digital image processor 30 and "simple" thresholding circuit 40. In operation, document 10 containing various objects of interest is scanned by scanner 20 to produce multi-bit, typically eight-bit, bit-mapped gray-scale image data, L. This data is routed, via leads 25, to a data input of digital image processor which, in turn and to the extent relevant here, thresholds the scanned image data and generates both a modified gray-scale image on leads 37 and an output binary image on leads 33. The modified gray-scale image, as described in greater detail below, has its edges enhanced by processor 30 to subsequently increase thresholding accuracy. The modified gray-scale image data appearing on leads 37 is routed to an input of thresholding circuit 40 which compares each multi-bit image pixel in the modified image data against a pre-defined fixed threshold value thereby providing so-called "simple" thresholding. The resulting thresholded, i.e., binary, image produced by circuit 40 is applied, via leads 45, as another output binary image. Digital image processor 30 performs thresholding in accordance with our present invention. To handle high data throughputs required for processing bit-mapped images, processor 30 is preferably fabricated from dedicated hardware circuitry, including our inventive circuit 600 shown in FIG. 6 and discussed in detail below. Alternatively, this processor can be implemented through one or more general purpose microprocessors, with associated memory and supporting circuitry and suitably programmed to implement our present invention in software, provided that the microprocessor(s) could execute instructions sufficiently fast to produce the requisite data throughput.

Figure 2B:
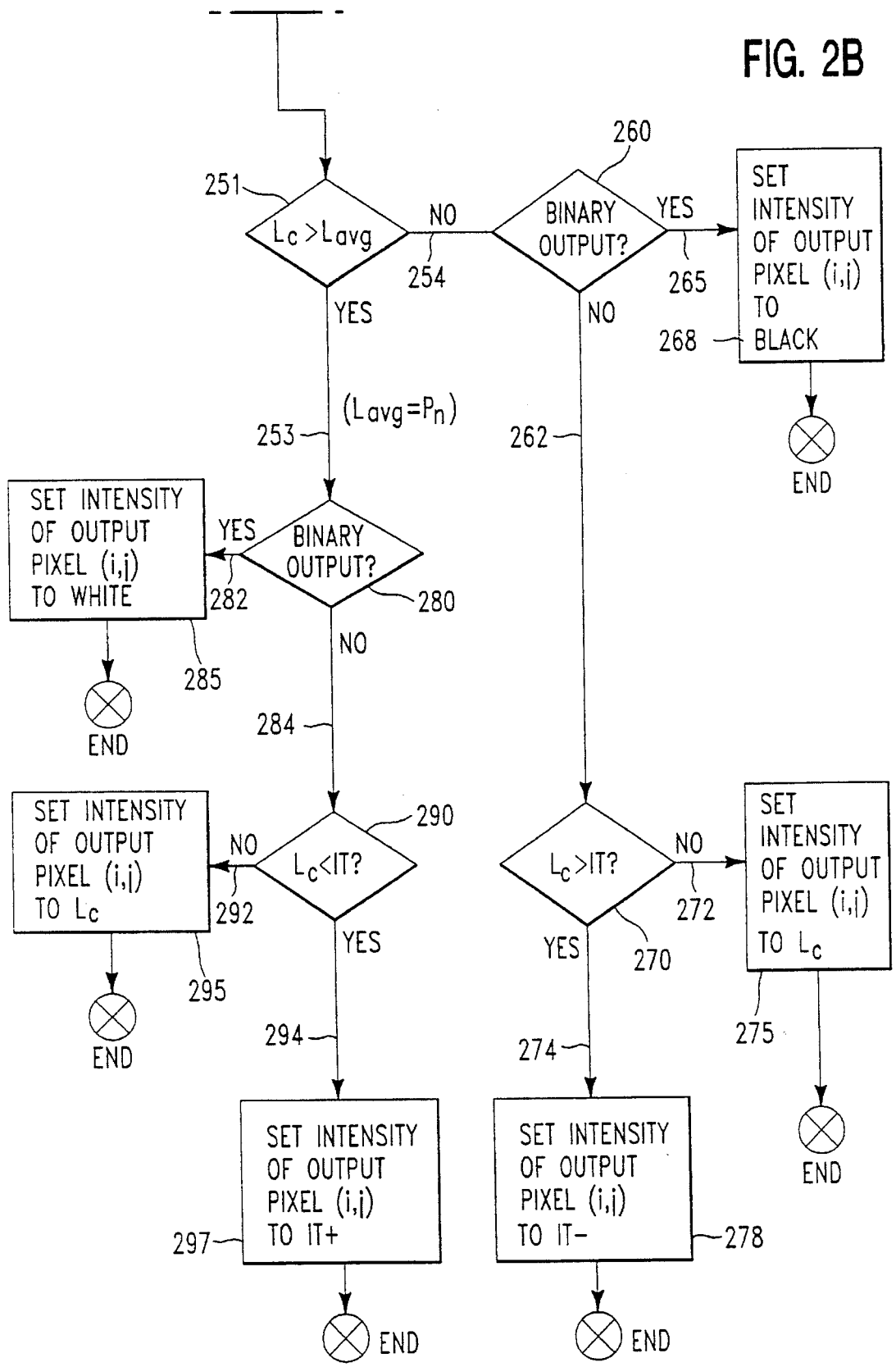

A high-level flowchart of our inventive multi-windowing thresholding method 200 is collectively depicted in FIGS. 2A and 2B, for which the correct alignment of the drawing sheets for these figures is shown in FIG. 2. During the course of discussing method 200, reference will also be made to FIGS. 3A–3C where appropriate.

Method 200 is performed for each and every gray-scale pixel in an incoming image, thereby iterating through the image. Since the manner through which each gray-scale image pixel is processed is identical across all such pixels, we will merely discuss this routine in the context of processing generalized pixel(i,j), where i and j are positive integers and define pixel horizontal and vertical indices within the incoming gray-scale image. In addition to gray-scale image data, a user supplies values of two input parameters, specifically fixed thresholds IT and GT. These thresholds are adjusted, as described below, either to provide satisfactory thresholding across a multitude of differing images with varying characteristics, such as contrast and illumination, or can be adjusted to provide optimum thresholding for any one type of image and/or scanning condition. In any event, as a result of performing method 200 on all such gray-scale image pixels, a thresholded binary or modified gray-scale image will be generated, with each pixel in the resulting image corresponding to a pixel in the incoming image. Although not shown in FIGS. 2A and 2B, if a modified gray-scale image is to be produced, that image is then thresholded in a "simple" fashion using a fixed, pre-defined threshold, having a value IT, as that value is defined below. The modified gray-scale image can then be further processed, e.g., through scaling or filtering, as desired.

In particular, upon starting method 200, step 203 is first performed. This step determines a gradient strength for pixel(i,j). This is accomplished by use of the so-called "Sobel" gradient operator on a window of pixels centered about pixel(i, j). As shown in FIG. 3A, this matrix, shown as matrix 300, is a 3-by-3 window centered about pixel(i,j). As collectively defined in equations (1)–(3) below, the Sobel operator relies on computing horizontal and vertical pixel intensity gradients, GX (i,j) and GY (i,j), respectively, and for each pixel position (i,j) forming the gradient strength, G (i,j) as an absolute sum of GX (i,j) and GY (i,j):

$$GX(i,j)=L(i+1,j-1)+2L(i+1,j)+L(i+1,j+1) -L(i-1,j-1)-2L(i-1,j)-L(i-1,j+1) \quad (1)$$

$$GY(i,j)=L(i-1,j+1)+2L(i,j+1)+L(i+1,j+1) -n(i-1,j-1)-2L(i,j-1)-L(i+1,j-1) \quad (2)$$

$$G(i,j)=|Gx(i,j)|+|GY(i,j)| \quad (3)$$

where: G (i,j) is the gradient strength at pixel position (i, j); and

L (i,j) is the image intensity, luminance, at pixel position (i,j).

The resulting gradient strength value for every image pixel collectively forms a gradient strength record for the entire scanned image.

Once the gradient strength, G(i,j), is determined for pixel(i,j), method 200 advances to step 1206. This step, when performed, determines the area gradient for pixel position (i,j), i.e., GS (i,j), as the sum of the gradient strengths for each and every pixel position within an (N-2)-by-(N-2) window centered about pixel position (i,j). This window is illustratively 5-by-5 pixels in size and is shown, as window 370, in FIG. 3C for an N-by-N, illustratively 7-by-7, window shown in FIG. 3B, the latter being window 330, centered about pixel (i,j). For purposes of comparison, the periphery of an N-by-N window is shown as window 350 in FIG. 3C. Though shown sequentially to simplify illustration, step 245 is generally performed at essentially the same time, as symbolized by dashed line 244, as are steps 203 and 206. Step 245 determines both minimum and maximum pixel intensity values, $L_{min}$ and $L_{max}$, respectively, in an N-by-N window centered about pixel (i,j).

Once the area gradient is determined for pixel position (i,j), then, through the remainder of method 200, the three image measures, GS(i,j) and $L_{min}$ and $L_{max}$, associated with this particular pixel position are used to classify pixel(i,j) as an object pixel, i.e., black, or a background pixel, i.e., white.

In particular, decision step 208 is performed to assess whether the value of the area gradient for pixel(i,j), i.e., GS(i,j), exceeds a pre-defined threshold value, GT, or not. This test determines whether pixel(i,j) lies in a vicinity of an edge in the scanned image, or not. If the area gradient is less than the threshold value, GT, then pixel(i,j) does not lie near an edge. Hence, pixel(i,j) lies within a localized relatively constant tone, i.e., "flat" field, region of the scanned gray-scale image. In this case, method 200 advances along NO path 211 emanating from decision block 208 to decision block 215. This latter decision block determines whether the gray-scale intensity of pixel(i,j), i.e., $L_c$, exceeds another pre-defined threshold value, IT. If this gray-scale value is less than or equal to the threshold, the pixel is classified as an object pixel, i.e., here black; otherwise, the pixel is classified as a background pixel, i.e., here white. Specifically, on the one hand, if pixel intensity, $L_c$, is less than or equal to threshold IT, decision block 215 advances method 200, along NO path 217, to decision block 222. This latter decision block determines whether a user has previously instructed the method to produce a binary or gray-scale output pixel. If a binary pixel is desired, then decision block 222 advances the method, via YES path 225, to block 228 which, in turn, sets an intensity of output pixel(i,j) to black, i.e., zero. Alternatively, if a gray-scale output is desired, then decision block 222 advances method 200, via NO path 224, to block 230. This latter block, when performed, sets the intensity of output pixel(i,j) to the intensity of $L_c$, without any modifications made thereto. If, on the other hand, pixel intensity, $L_c$, exceeds threshold IT, decision block 215 advances method 200, along YES path 218, to decision block 232. This latter decision block determines whether a user has previously instructed the method to produce a binary or gray-scale output pixel. If a binary pixel is desired, then decision block 232 advances the method, via YES path 235, to block 237 which, in turn, sets an intensity of output pixel(i,j) to white, i.e., one. Alternatively, if a gray-scale output is desired, then decision block 232 advances method 200, via NO path 234, to block 241. This latter block, when performed, sets the intensity of output pixel(i,j) to the intensity of $L_c$, without any modifications made thereto. Once step 228, 230, 237 or 241 is performed, method 200 is completed for pixel(i,j); the method is then repeated for the next image pixel in succession, and so forth.

Alternatively, if area gradient, GS(i,j) exceeds the threshold value, GT, then pixel(i,j) lies in the vicinity of an edge. In this case, step 245 is now performed to ascertain the values of $L_{max}$ and $L_{min}$, if these values have not already been determined, as set forth above. Thereafter, method 200 advances to block 248 which calculates an average pixel intensity value, $L_{avg}$, occurring within the N-by-N pixel window centered about pixel position (i,j). This average intensity value is simply determined by averaging the values $L_{max}$ and $L_{min}$.

Once this average value has been ascertained, method 200 advances to decision block 251 which compares the intensity of pixel(i,j), i.e., $L_c$, against its associated average intensity value, $L_{avg}$. When this pixel is situated on a darker side of an edge and hence an object pixel, then its associated average intensity value will be greater than or equal to its intensity value, $L_c$. In this case, the output binary pixel for pixel position (i,j) will be set to black. Otherwise, if pixel (i,j) is situated near an edge but its average intensity value, $L_{avg}$, would be less than its intensity value, $L_c$, then this pixel is situated on the lighter side of an edge and hence is a background pixel; hence, its corresponding binary output pixel will be set to white. If gray-scale output values are to be supplied in lieu of binary values, then the gray-scale values for the corresponding output pixels are modified, as described below, from the incoming pixel values, $L_c$, to enhance edges and increase thresholding accuracy.

In particular, if gray-scale pixel intensity, $L_c$, for pixel(i,j) is less than or equal to its associated average intensity value, $L_{avg}$, then decision block 251 advances method 200, along NO path 254, to decision block 260. This latter decision block determines whether a user has previously instructed the method to produce a binary or gray-scale output pixel. If a binary pixel is desired, then decision block 260 advances the method, via YES path 265, to block 268 which, in turn, sets an intensity of output pixel(i,j) to black, i.e., zero. However, if a gray-scale output is desired, then decision block 260 advances method 200, via NO path 262, to decision block 270. This latter block, when performed, determines whether pixel intensity, $L_c$, exceeds the pre-defined threshold value IT. If the intensity of pixel (i,j) is less than or equal to threshold IT, then method 200 advances, along NO path 272, to block 275, which, when executed, sets the gray-scale output for pixel (i,j) to the pixel intensity value $L_c$. Now, if the intensity of pixel(i,j) exceeds the value of threshold IT, then method 200 advances, along YES path 274, to block 278, which, when executed, sets the gray-scale output for pixel(i,j) to a value that is slightly less, i.e., IT–, than threshold IT.

Alternatively, if gray-scale pixel intensity, $L_c$, exceeds its associated average intensity value, $L_{avg}$, then decision block 251 advances method 200, along YES path 253, to decision block 280. This latter decision block determines whether a user has previously instructed the method to produce a binary or gray-scale output pixel. If a binary pixel is desired, then decision block 280 advances the method, via YES path 282, to block 285 which, in turn, sets an intensity of output pixel(i,j) to white, i.e., one. However, if a gray-scale output is desired, then decision block 280 advances method 200, via NO path 284, to decision block 290. This latter block, when performed, determines whether pixel intensity, $L_c$, is less than pre-defined threshold value IT. If the intensity of pixel(i,j) exceeds or is equal to threshold IT, then method 200 advances, along NO path 292, to block 295, which, when executed, sets the gray-scale output for pixel (i,j) to the pixel intensity value $L_c$. Now, if the intensity of pixel(i,j) is less than threshold IT, then method 200 advances, along YES path 294, to block 297, which, when executed, sets the gray-scale output for pixel(i,j) to a value that is slightly larger, i.e., IT+, than threshold IT. The exact amount by which IT+ or IT– exceeds or is less than, respectively, threshold IT is not critical and is empirically determined. Once step 268, 275, 278, 285, 295 or 297 has been performed for pixel(i,j); method 200 is then repeated for the next image pixel in succession, and so forth.

Figure 4:
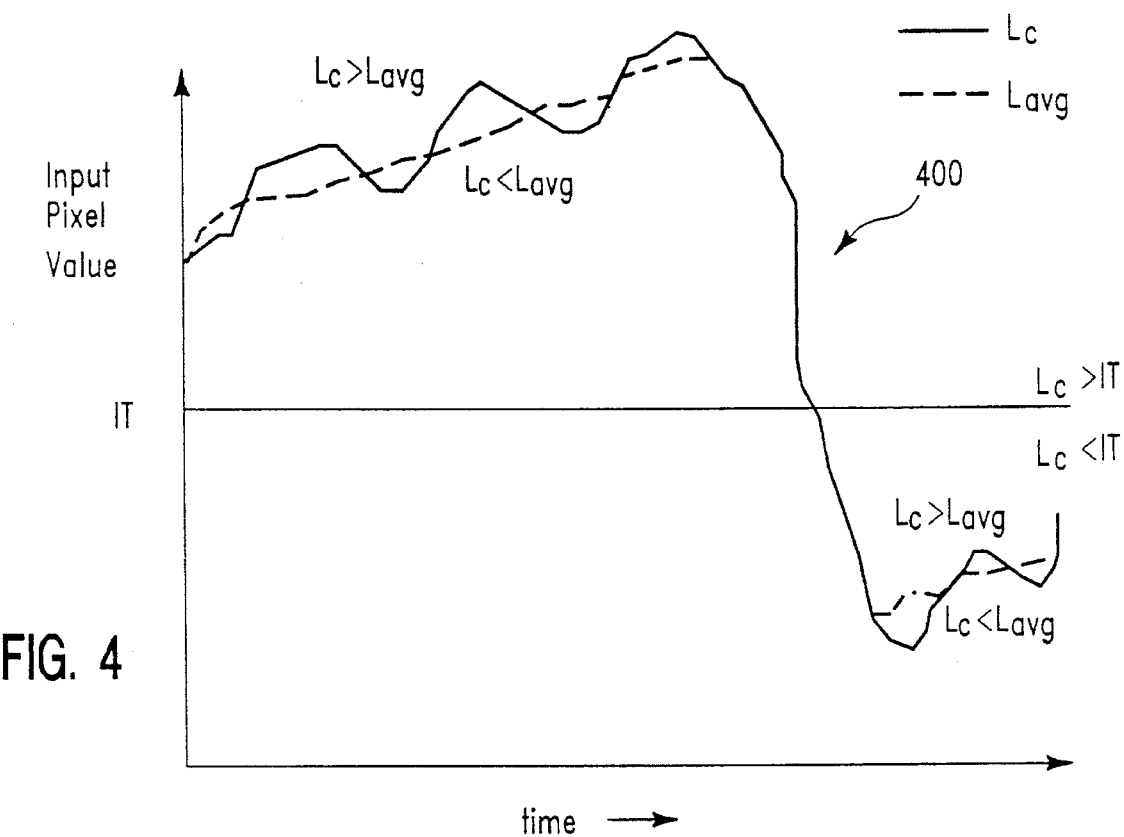
FIG. 4 graphically depicts intensity profile 400 of an illustrative scan line of an original gray-scale image, such as that illustratively on document 10 shown in FIG. 1.
Figure 5:
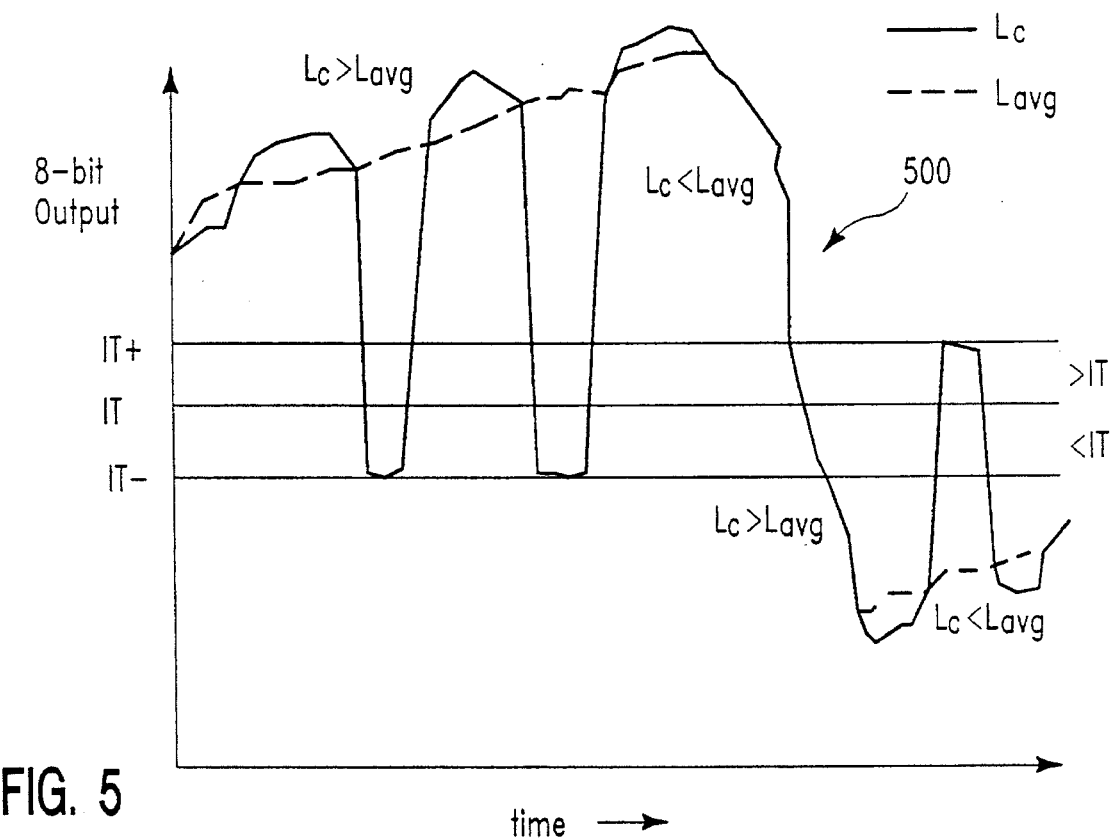
FIG. 5 graphically depicts a modified intensity profile which results after thresholding intensity profile 400 shown in FIG. 4 according to the teachings of our present invention.

With this understanding in mind, consider FIG. 4 which graphically depicts intensity profile 400 of an illustrative scan line of an original gray-scale image, such as that illustratively on document 10 shown in FIG. 1. As a result of processing profile 400 through our inventive method, modified intensity profile 500, shown in FIG. 5, results. As is readily apparent from comparing profiles 400 and 500, only the gray-scale values of the image pixels located near an edge are modified. In this regard, when such a pixel is located in a darker side of an edge and while its intensity is larger than threshold value IT, the intensity of this pixel is decreased to a value, IT–, slightly less than threshold IT. Alternatively, when an image pixel is located in a brighter side of an edge and while its intensity is less than threshold IT, the intensity of this pixel is increased to a value, IT+, slightly greater than this threshold. A high quality image results by thresholding the resulting modified gray-scale image against fixed threshold value IT.

Figure 6:
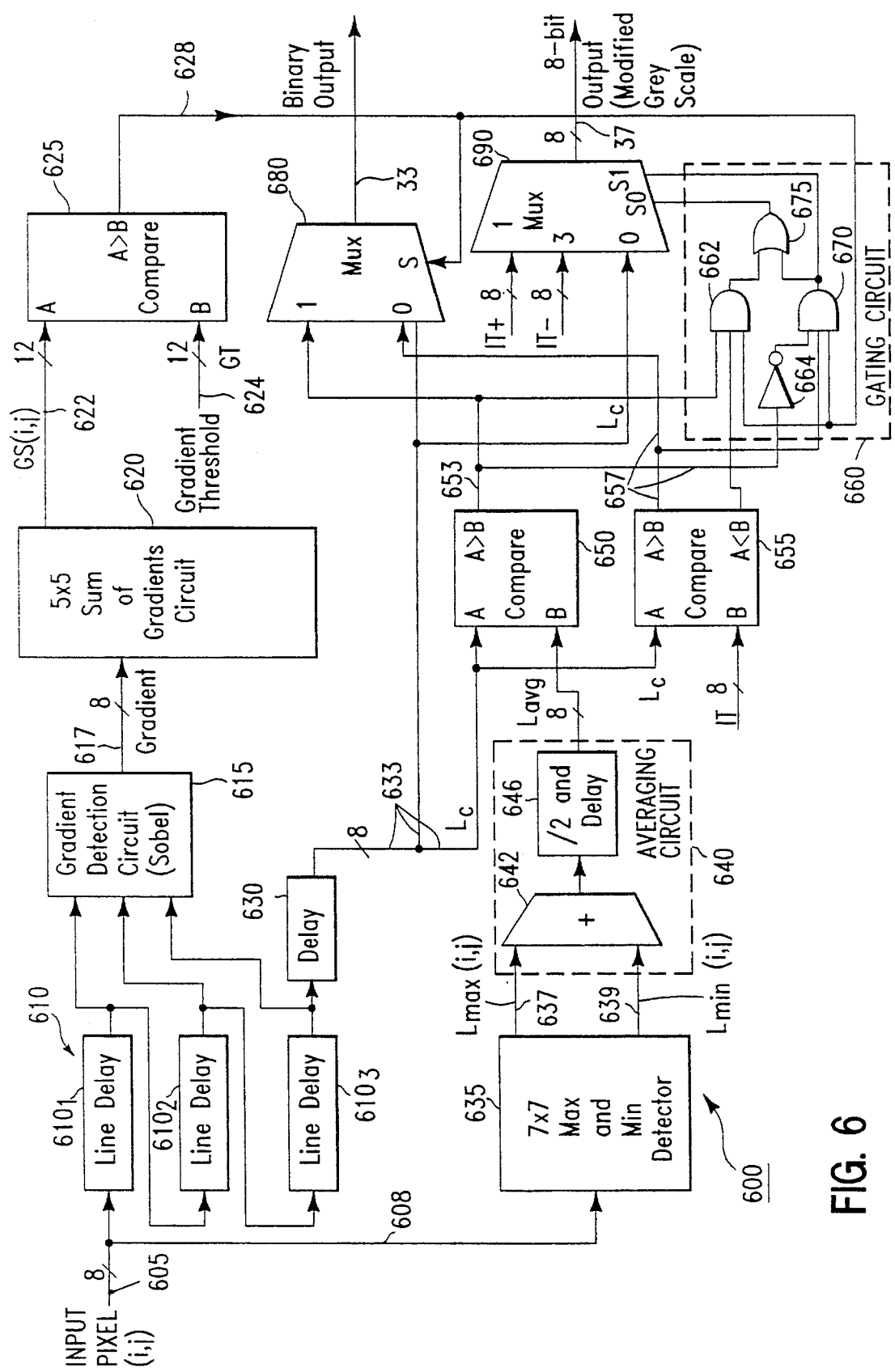
FIG. 6 depicts a block diagram of a preferred embodiment of our present invention.

FIG. 6 depicts a block diagram of a preferred hardware embodiment, specifically circuit 600, of our present invention. This embodiment would form part of digital image processor 30 shown in FIG. 1. Clearly, image processor 30 would contain conventional circuitry for clocking, and control and other image processing functions; however, all that circuitry is omitted herefrom as being irrelevant to an understanding of the present invention.

As shown, circuit 600 is formed of line delays 610, specifically line delay elements $610_1$, $610_2$ and $610_3$; delay 630, gradient detector 615; sum of gradients circuit 620; comparators 625, 650 and 655; 7-by-7 Max and Min detector 635; averaging circuit 640; multiplexors 680 and 690 and gating circuit 660 formed of inverter 664, and gates 662, 670 and 675. Circuit 600 collectively implements method 200 depicted in FIGS. 2A and 2B and discussed in detail above.

Figure 7:
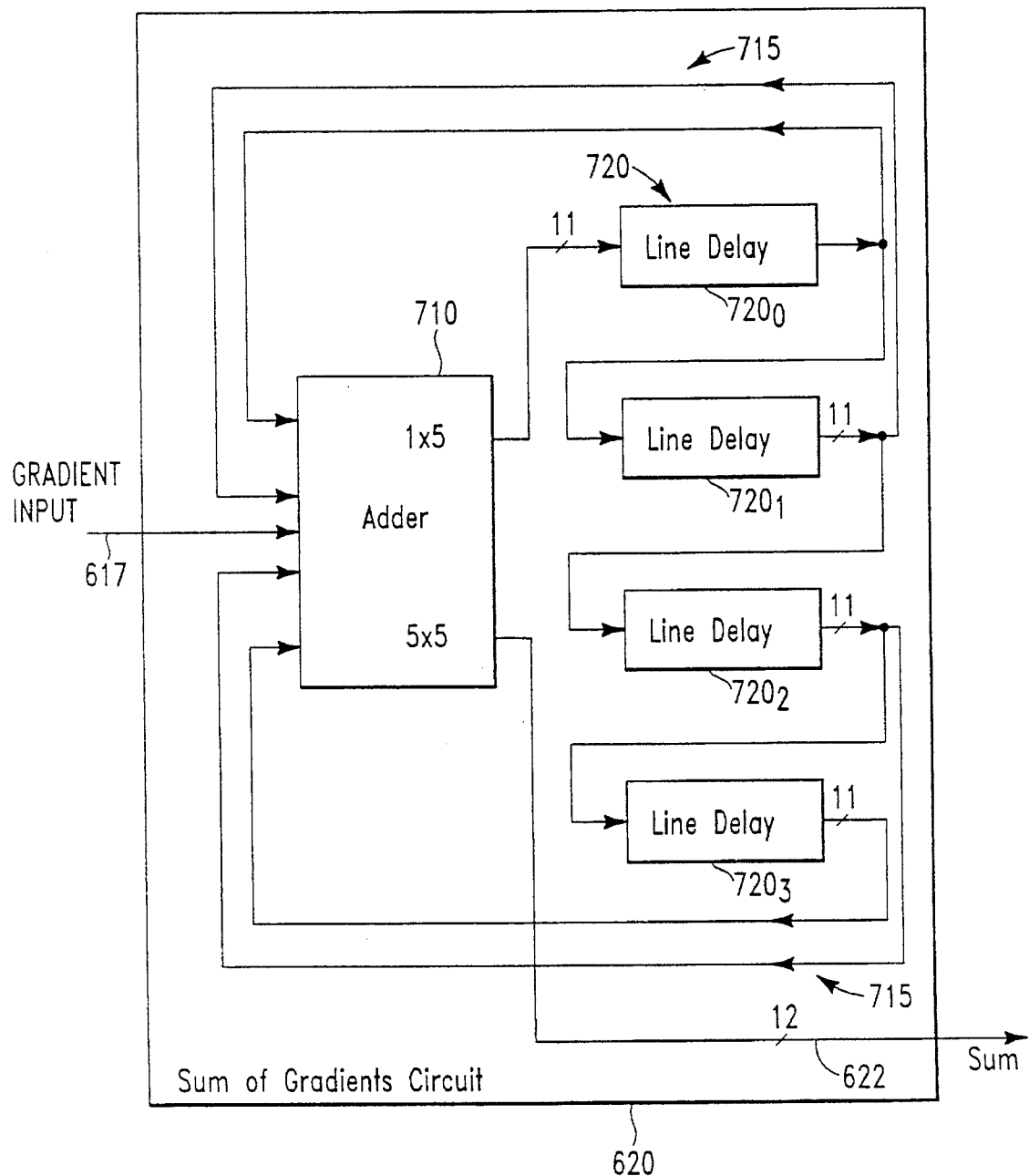
FIG. 7 depicts a block diagram of Sum of Gradients Circuit 620 which forms part of circuit 600 shown in FIG. 6.

In operation, eight-bit input gray-scale image pixels(i,j) are routed in parallel, via leads 605 and 608, to an input of line delays 610 and to an input of 7-by-7 Max and Min detector 635. Delays 610, specifically series-connected single line delay elements $610_1$, $610_2$ and $610_3$, provide a 3-by-3 window of image pixel data centered around image pixel(i,j). Each delay element is tapped at three locations to provide each three-pixel line of the window. The outputs of all three delay elements are routed to respective inputs of gradient detection circuit 615 which, through calculation of the Sobel operator, as described above, provides an intensity gradient value for pixel(i,j), i.e., G(i,j), on output leads 617. This gradient value is applied to an input to sum of gradients circuit 620 which, in turn, sums all the gradient intensity values in a 5-by-5 window centered about pixel position (i,j) and provides the resultant sum, as an area gradient value, i.e., GS(i,j), on 12-bit output leads 622. Circuit 620 is shown in FIG. 7 and discussed in detail below. This area gradient value is applied to an input ("A") of comparator 625 which compares this value against pre-defined gradient threshold, GT; the latter being applied to another input ("B") to this same comparator. The resulting comparison output, appearing on lead 628, indicates whether pixel(i,j) is situated in the vicinity of an edge or not. The comparison output is applied as an input to gates 662 and 670 for use in selecting through multiplexor 690, as discussed in detail below, the appropriate gray-scale output, i.e., $L_c$ or one of the pre-defined values IT– or IT+.

Max and Min detector 635, depicted in FIG. 8 and discussed in detail below, ascertains the maximum and minimum pixel intensity values, i.e., $L_{max}$ and $L_{min}$, of those pixels contained within a 7-by-7 window centered about pixel(i,j). Resulting $L_{max}$ and $L_{min}$ values, appearing on leads 637 and 639, are then averaged by averaging circuit 640. This circuit contains summer 642, which merely adds these two values together into a resultant sum, and /2 and delay circuit 646 which implements a divide by two operation by shifting the sum one-bit to the right; hence dropping the least significant bit. The resultant averaged intensity value is then appropriately delayed within circuit 646 for purposes of achieving proper synchronization within circuit 600.

If the area gradient value, GS(i,j), exceeds the pre-defined gradient threshold, GT, then the averaged intensity value, $L_{avg}$, used as a threshold level in determining the value of output center pixel (i,j); else, if the area gradient value is less than or equal to the gradient threshold, then value IT is used as the threshold level in determining the value of output center pixel (i,j). In this regard, the averaged intensity value, $L_{avg}$, is applied to one input of comparator 650. The current center pixel value, $L_c$, is applied through delay element 630 to another input of comparator 650 as well as to one input of comparator 655. The delay of element 630 is set to assure that the proper corresponding values of $L_c$ and $L_{avg}$ are synchronously applied to collectively comparators 650 and 655, multiplexors 680 and 690, and gating circuit 660. The fixed threshold value, IT, is applied to another input of comparator 655. Comparator 650 produces a low or high level output on lead 653 if pixel intensity value $L_c$ is less than, or equal to or greater than, respectively, its associated averaged intensity value, $L_{avg}$. This output level is applied to both one input ("1") of multiplexor 680 and one input of AND gate 662. Multiplexor 680 selects the output binary pixel as between two bits generated from using two different thresholds, i.e., value IT or $L_{avg}$. In that regard, comparator 655 produces a high output level at its A>B output whenever the predefined threshold value IT is greater than pixel intensity value $L_c$. The level at output A>B is routed, via leads 657, to another input ("0") of multiplexor 680 and to one input of AND gate 670. Multiplexor 680 produces the output binary value for pixel(i,j). To do so, the comparison output level produced by comparator 625, indicative of whether the area gradient, GS(i,j), exceeds the gradient threshold, GT, is applied as a select signal, via lead 628, to a select ("S") input of multiplexor 680. If this select signal is high, thereby indicating that the area gradient exceeds the gradient threshold, then multiplexor 680 routes the level applied to its "1" input, i.e., that generated by comparator 650, to binary output lead 33; else, the multiplexor routes the level then appearing at its "0" input to lead 33.

Multiplexor 690 routes the center pixel value, $L_c$, or a pre-defined value IT+ or IT− as the output gray-scale value to eight-bit output leads 37. Pre-defined values IT+ and IT− along with center pixel value $L_c$ are applied to different corresponding eight-bit inputs to multiplexor 690. The output of this multiplexor is determined by the state of two select signals, S0 and S1: if these signals assume the binary values zero, "1" or "3", then the multiplexor will route center pixel value $L_c$, value IT+ or value IT−, respectively, to output leads 37. Gating circuit 660, in response to the comparison output signals produced by comparators 625, 650 and 655 generates, by simple combinatorial logic, the two select signals, S0 and S1, applied to multiplexor 690. Specifically, if the area gradient is not larger than the gradient threshold, then, as discussed above, gray-scale pixel value $L_c$, without any modification, will be applied through multiplexor 690, to output leads 37. Alternatively, if the area gradient exceeds the gradient threshold, then multiplexor 690 will apply either value IT+ or IT− as a modified gray-scale output value to lead 37 based upon whether center pixel intensity value $L_c$ is less than its corresponding average pixel intensity value, $L_{avg}$, or not. Since the operation of gating circuit 660 is self-evident from the above description to anyone skilled in the art, it will not be discussed in any further detail. Values IT− and IT+ are merely held in appropriate registers (not shown) and from there applied to corresponding inputs of multiplexor 690.

FIG. 7 depicts a block diagram of Sum of Gradients Circuit 620 which forms part of circuit 600 shown in FIG. 6. Circuit 620, as shown in FIG. 7, is formed of adder 710 and line delays 720, the latter containing four series-connected single-line delay elements $720_0$, $720_1$, $720_2$ and $720_3$. Incoming gradient intensity values are applied, over lead 617 from gradient detection circuit 615 (shown in FIG. 6), to one input of adder 710, shown in FIG. 7. In addition, the output of each of the four line delays 720 is routed over a different one of four feedback leads 715 to a different corresponding input of this adder. As a result, adder 710 forms partial sums of 1-by-5 gradient values which are applied, as input, to delay element $720_0$. To generate a 5-by-5 sum of the intensity gradients, hence producing an area gradient measure, four preceding corresponding 1-by-5 sums are added together within adder 710 to a present 1-by-5 sum, with the resultant overall 5-by-5 sum being applied to output lead 622. Use of these delay elements connected in this fashion substantially reduces the amount of logic that would otherwise be needed to generate twenty-five intermediate sums.

Figure 8:
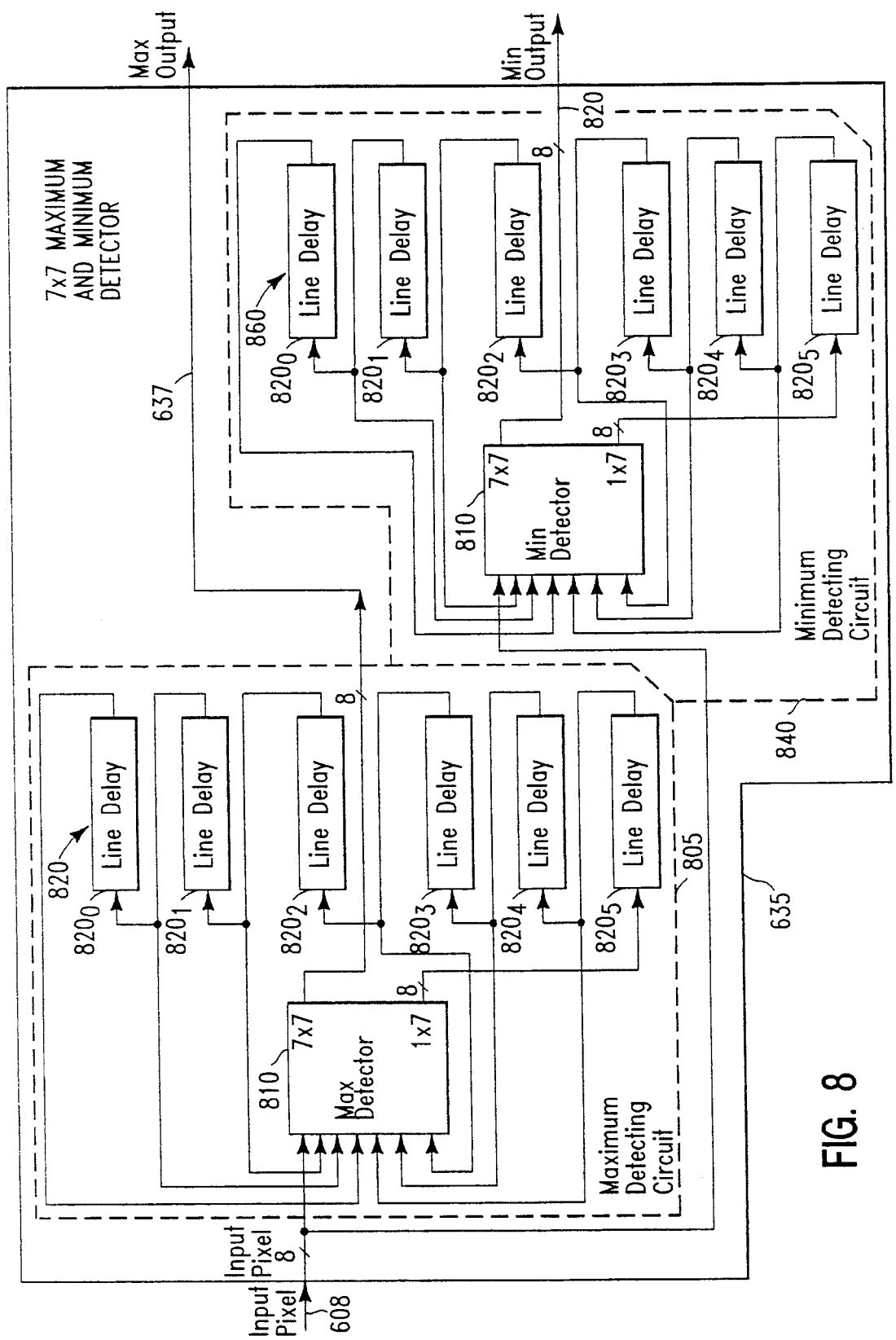
FIG. 8 depicts a block diagram of 7-by-7 Maximum and Minimum Detector 635 which also forms part of circuit 600 shown in FIG. 6.

FIG. 8 depicts a block diagram of 7-by-7 Maximum and Minimum Detector 635 which also forms part of circuit 600 shown in FIG. 6. As noted above, detector 635 determines the maximum and minimum pixel intensity values, $L_{max}$ and $L_{min}$, respectively, within a 7-by-7 window centered about pixel position(i,j). This detector is formed of two separate circuits: maximum detecting circuit 805 and minimum detecting circuit 840 which extract a pixel value having a maximum and minimum intensity value, respectively, of all the pixels contained within the 7-by-7 window centered around pixel(i,j) and respectively apply those two values to leads 637 and 639. Circuit 805 contains maximum detector 810 and line delays 820, the latter being formed of six series-connected single-line delay elements $820_0$, $820_1$, $820_2$, $820_3$, $840_4$ and $840_5$. Similarly, circuit 840 contains minimum detector 850 and line delays 860, the latter being formed of six series-connected single-line delay elements $860_0$, $860_1$, $860_2$, $860_3$, $860_4$ and $860_5$. Inasmuch as circuits 805 and 840 function is an identical manner with the exception that detector 810 locates maximum values while detector 850 locates a minimum values, both from the same series of pixel intensity values applied over lead 608, we will only discuss circuit 805 in detail; those skilled in the art will then readily appreciate how circuit 840 functions from this discussion.

Incoming pixel intensity values are applied, over lead 608 to one input of maximum detector 810. In addition, the output of each of the six line delays 820 is routed over a different one of six feedback leads to a respective input of this detector. Consequently, maximum detector 810 extracts the maximum pixel intensity value from a 1-by-7 series of pixel values and applies this maximum value as input to line delay element $860_6$. In conjunction with six preceding corresponding maximum pixel values stored in line delays 820, maximum detector 810 locates the maximum pixel intensity value for the 7-by-7 window centered about pixel(i, j) and applies that value, as output, to leads 637. Here, the use of series-connected delay elements 820 and 860 substantially reduces the amount of logic that would otherwise be needed to generate intermediate maximum and minimum pixel intensity values.

As one can now appreciate, the quality of the resulting thresholded image produced by our invention is controlled by the values defined for thresholds GT and IT. Threshold GT is set to properly classify image pixels located in the vicinity of edges in an image. A relatively low GT value tends to extract edge pixels of light objects. Threshold IT is set to properly classify pixels located in image regions of uniform tone, i.e., "flat" fields. In that regard, a low IT value tends to classify pixels of a uniform gray region as white background. If a relatively high GT value is used, then our invention for all practical purposes performs similar to "simple" thresholding with a fixed threshold IT. In this situation, the value of threshold GT will always be larger than the area gradient, thereby causing our invention to classify pixels by essentially solely comparing each image pixel of interest against fixed threshold IT. Our invention can also produce an outline image through setting the value of threshold IT to zero, in which case all the image pixels will be classified as white except for the edge pixels where their associated area gradients are larger than the gradient threshold, GT.

Although one preferred embodiment of the present invention has been shown and described in detail herein, many other varied embodiments that incorporate the teachings of the invention may be easily constructed by those skilled in the art.

INDUSTRIAL APPLICABILITY AND ADVANTAGES

The present invention is useful in image scanning systems and particularly for thresholding scanned gray-scale images containing line art. The invention advantageously provides more accurate thresholding than that previously obtainable in the art by exhibiting enhanced immunity to background noise in the scanned image and substantially eliminating boundary artifacts from a thresholded image.

We claim:

1. Apparatus for thresholding an input gray-scale image into a first output image, wherein said input image is formed of input pixels each having a multi-bit gray-scale pixel value associated therewith, and wherein said first output image is formed of pixels each having a corresponding output pixel value associated therewith, said apparatus comprising:

means, responsive to a plurality of pixel values in the input image, for ascertaining an area gradient value for a first window, of pre-defined size, of intensity gradient values associated with ones of the pixel values centered about a current pixel position, (i,j) (where i and j are pixel indices), in the input image;

means, responsive to a second window, of pre-defined size, of input pixels centered about the current pixel position (i,j) in the input image, for determining a maximum pixel value and a minimum pixel value of the pixel values contained within said second window; and means, responsive to the area gradient value and the maximum and minimum pixel values, for thresholding a current one of the pixel values for the current pixel position (i,j) in the input image into an output pixel value at a corresponding position in the first output image.

2. The apparatus of claim 1 wherein the area gradient ascertaining means comprises:

means, responsive to a third window, of the pixel values, of a pre-defined size and centered about the current pixel position (i,j) in the input image, for measuring an intensity gradient, G(i,j), value for the current pixel position such that, for a succession of input pixels in the input image, a plurality of corresponding intensity gradient values is defined; and means for forming the first window of intensity gradient values from the plurality of intensity gradient values and, in response to said first window, determining said area gradient value.

3. The apparatus of claim 2 wherein said first output image is a binary image and the corresponding output pixel value is a single-bit value.

4. The apparatus in claim 3 wherein said first window forming and area gradient determining means comprises means for summing individual ones of the intensity gradient values in said first window to produce the area gradient value.

5. The apparatus in claim 4 wherein said intensity gradient measuring means comprises means for producing the intensity gradient value for the current pixel position by processing said third window of input pixel values through a Sobel operator.

6. The apparatus in claim 5 wherein the third window is a 3-by-3 window of input pixel values and the Sobel operator implements the following equations:

$$GX(i,j)=L(i+1,j-1)+2L(i+1,j)+L(i+1,j+1) -L(i-1,j-1)-2L(i-1,j)-L(i-1,j+1);$$

$$GY(i,j)=L(i-1,j+1)+2L(i,j+1)+L(i+1,j+1) -L(i-1,j-1)-2L(i,j-1)-L(i+1,j-1);$$

and $$G(i,j)=|GX(i,j)|+|GY(i,j)|$$

where: L (i,j) is an input pixel value, in luminance, for the pixel position (i,j) in the input image.

7. The apparatus in claim 6 further comprising first, second and third separate series of single-line delay elements for correspondingly forming said first, second and third windows.

8. The apparatus in claim 6 wherein the first window is a 5-by-5 window of the intensity gradient values and the second window is a 7-by-7 window of the input pixels.

9. The apparatus in claim 4 wherein said thresholding means comprises:

means for comparing the area gradient value, GS(i,j), to a pre-defined gradient threshold value, GT, so as to produce a comparison signal indicative of whether a current one input pixel located at the current pixel position (i,j) in the input image lies in a vicinity of an edge in said input image;

means, responsive to said comparison signal and operative if the comparison signal indicates that said current one input pixel does not lie in the vicinity of the edge, for thresholding said input pixel value at position (i,j) in the input image against a pre-defined fixed gray-scale threshold value, IT, to yield the corresponding binary output value at pixel position (i,j) in the first output image; and means, responsive to said comparison signal and operative if the comparison signal indicates that said one current input pixel does lie within the vicinity of an edge, for setting said corresponding binary output value to a first or second state if the current one pixel value either exceeds or is less than a pre-defined function of the maximum and minimum pixel values, respectively.

10. The apparatus in claim 9 wherein said pre-defined function is an average of the maximum and minimum pixel values.

11. The apparatus in claim 10 wherein said intensity gradient measuring means comprises means for producing the intensity gradient value for the current pixel position by processing said third window of input pixel values through a Sobel operator.

12. The apparatus in claim 11 wherein the third window is a 3-by-3 window of input pixel values and the Sobel operator implements the following equations:

$$GX(i,j)=L(i+1,j-1)+2L(i+1,j)+L(i+1,j+1) -L(i-1,j-1)-2L(i-1,j)-L(i-1,j+1);$$

$$GY(i,j)=L(i-1,j+1)+2L(i,j+1)+L(i+1,j+1) -L(i-1,j-1)-2L(i,j-1)-L(i+1,j-1);$$

and $$G(i,j)=|GX(i,j)|+|GY(i,j)|$$

where: L(i,j) is an input pixel value, in luminance, for the pixel position (i,j) in the input image.

13. The apparatus in claim 12 further comprising first, second and third separate series of single-line delay elements for correspondingly forming said first, second and third windows.

14. The apparatus in claim 12 wherein the first window is a 5-by-5 window of the intensity gradient values and the second window is a 7-by-7 window of the input pixels.

15. The apparatus in claim 9 further comprising:
means, responsive to said comparison signal and the pixel value ($L_c$) at the current pixel position (i,j), for producing a modified gray-scale output pixel value at position (i,j) in a second output image, wherein, if the comparison signal indicates that the one current input pixel does not lie in the vicinity of the edge in said input image, the modified gray-scale output pixel value is set equal to the pixel value $L_c$, or if the comparison signal indicates that the current one input pixel does lie in the vicinity of the edge, the modified gray-scale output pixel value is set equal to a pre-defined value greater than or less than the threshold value IT when the pixel value $L_c$ is greater or less than, respectively, the threshold value IT; and means for thresholding the modified gray-scale output pixel value, against the threshold value IT, to yield a corresponding second binary output pixel value at a pixel position (i,j) within a second output image.

16. The apparatus in claim 15 further comprising first, second and third separate series of single-line delay elements for correspondingly forming said first, second and third windows.

17. The apparatus in claim 15 wherein the first window is a 5-by-5 window of the intensity gradient values and the second window is a 7-by-7 window of the input pixels.

18. A method for thresholding an input gray-scale image into a first output image, wherein said input image is formed of input pixels each having a multi-bit gray-scale pixel value associated therewith, and wherein said first output image is formed of pixels each having a corresponding output pixel value associated therewith, the method comprising the steps of:
ascertaining, in response to a plurality of pixel values in the input image, an area gradient value for a first window, of pre-defined size, of intensity gradient values associated with ones of the pixel values centered about a current pixel position, (i,j) (where i and j are pixel indices), in the input image;

determining, in response to a second window, of pre-defined size, of input pixels centered about the current pixel position (i,j) in the input image, a maximum pixel value and a minimum pixel value of the pixel values contained within said second window; and thresholding, in response to the area gradient value and the maximum and minimum pixel values, a current one of the pixel values for the current pixel position (i, j) in the input image into an output pixel value at a corresponding position in the first output image.

19. The method of claim 18 wherein the area gradient ascertaining step comprises the steps of:
measuring, in response to a third window, of the pixel values, of a pre-defined size and centered about the current pixel position (i,j) in the input image, an intensity gradient, G(i,j), value for the current pixel position such that, for a succession of input pixels in the input image, a plurality of corresponding intensity gradient values is defined; and forming the first window of intensity gradient values from the plurality of intensity gradient values and, in response to said first window, determining said area gradient value.

20. The method of claim 19 wherein said first output image is a binary image and the corresponding output pixel value is a single-bit value.

21. The method in claim 20 wherein said first window forming and area gradient determining step comprises the step of summing individual ones of the intensity gradient values in said first window to produce the area gradient value.

22. The method in claim 21 wherein said intensity gradient measuring step comprises the step of producing the intensity gradient value for the current pixel position by processing said third window of input pixel values through a Sobel operator.

23. The method in claim 22 wherein the third window is a 3-by-3 window of input pixel values and the Sobel operator implements the following equations:

$$GX(i,j)=L(i+1,j-1)+2L(i+i,j)+L(i+1,j+1) -L(i-1,j-1)-2L(i,j-1)-L(i-1,j+1);$$

$$GY(i,j)=L(i-1,j+1)+2L(i,j+1)+L(i+1,j+1) -L(i-1,j-1)-2L(i,j-1)-L(i+1,j-1);$$

and $$G(i,j)=|GX(i,j)|+|GY(i,j)|$$

where: L(i,j) is an input pixel value, in luminance, for the pixel position (i,j) in the input image.

24. The method in claim 23 wherein the first window is a 5-by-5 window of the intensity gradient values and the second window is a 7-by-7 window of the input pixels.

25. The method in claim 21 wherein said thresholding step comprises the steps of:
comparing the area gradient value, GS(i,j), to a pre-defined gradient threshold value, GT, so as to produce a comparison signal indicative of whether a current one input pixel located at the current pixel position (i,j) in the input image lies in a vicinity of an edge in said input image;

if the comparison signal indicates that said current one input pixel does not lie in the vicinity of the edge, thresholding, in response to said comparison signal, said input pixel value at position (i,j) in the input image against a pre-defined fixed gray-scale threshold value, IT, to yield the corresponding binary output value at pixel position (i,j) in the first output image; and if the comparison signal indicates that said one current input pixel does lie within the vicinity of an edge, setting, in response to said comparison signal, said corresponding binary output value to a first or second state if the current one pixel value either exceeds or is less than a pre-defined function of the maximum and minimum pixel values, respectively.

26. The method in claim 25 wherein said pre-defined function is an average of the maximum and minimum pixel values.

27. The method in claim 26 wherein said intensity gradient measuring step comprises the step of producing the intensity gradient value for the current pixel position by processing said third window of input pixel values through a Sobel operator.

28. The method in claim 27 wherein the third window is a 3-by-3 window of input pixel values and the Sobel operator implements the following equations:

$$GX(i,j)=L(i+1,j-1)+2L(i+l,j)+L(i+1,j+1) -L(i-1,j-1)-2L(i-l,j)-L(i-1,j+1);$$

$$GY(i,j)=L(i-1,j+1)+2L(i,j+1)+L(i+1,j+1) -n(i-1,j-1)-2L(i,j-1)-L(i+1,j-1);$$

and $$G(i,j) = |GX(i,j)| + |GY(i,j)|$$

where: L(i,j) is an input pixel value, in luminance, for the pixel position (i, j) in the input image.

29. The method in claim 28 wherein the first window is a 5-by-5 window of the intensity gradient values and the second window is a 7-by-7 window of the input pixels.

30. The method in claim 25 further comprising the steps of:

producing, in response to said comparison signal and the pixel value ($L_c$) at the current pixel position (i,j), a modified gray-scale output pixel value at position (i,j) in a second output image, wherein, if the comparison signal indicates that the one current input pixel does not lie in the vicinity of the edge in said input image, the modified gray-scale output pixel value is set equal to the pixel value $L_c$, or if the comparison signal indicates that the current one input pixel does lie in the vicinity of the edge, the modified gray-scale output pixel value is set equal to a pre-defined value greater than or less than the threshold value IT when the pixel value $L_c$ is greater or less than, respectively, the threshold value IT; and thresholding the modified gray-scale output pixel value, against the threshold value IT, to yield a corresponding second binary output pixel value at a pixel position (i,j) within a second output image.

31. The method in claim 30 wherein the first window is a 5-by-5 window of the intensity gradient values and the second window is a 7-by-7 window of the input pixels.

* * * * *

UNITED STATES PATENT AND TRADEMARK OFFICE
CERTIFICATE OF CORRECTION

PATENT NO. : 5,583,659
DATED : December 10, 1996
INVENTOR(S) : Yongchun Lee, et. al.

It is certified that error appears in the above-identified patent and that said Letters Patent is hereby corrected as shown below:

Claim 12, col. 14, line 54   -- 1,j+1) --

Claim 28, col. 16, line 64   -- $GY(i,j)=L(i-1,j+1)+2L(i,j+1)+L(i+1,j+1)-L(i-1,j-1)-2L(i,j-1)$- --

Signed and Sealed this

Tenth Day of February, 1998

Attest:

BRUCE LEHMAN

Attesting Officer        Commissioner of Patents and Trademarks